350-6.2 SR

OR 3,869,193

T3020R ✓

JC

United S[...]

Schmit

[11] 3,869,193

[45] Mar. 4, 1975

[54] OPTICAL MEMORY WITH IMPROVED SIGNAL-TO-NOISE RATIO

[75] Inventor: Francis M. Schmit, Saint Louis, Minn.

[73] Assignee: Honeywell, Inc., Minneapolis, Minn.

[22] Filed: Sept. 18, 1973

[21] Appl. No.: 398,364

[52] U.S. Cl. ........... 350/6, 350/DIG. 2, 340/173 LT

[51] Int. Cl. ........................................... G02b 17/00

[58] Field of Search ........... 350/6, 7, 285, 3.5, 162, 350/DIG. 2; 340/173 LT

[56] References Cited

UNITED STATES PATENTS

| | | | |
|---|---|---|---|
| 3,499,703 | 3/1970 | DeBitetto | 350/162 ZP |
| 3,580,656 | 5/1971 | Carson | 350/3.5 |
| 3,608,992 | 9/1971 | Phelps | 350/3.5 |
| 3,704,949 | 12/1972 | Thomas | 350/6 |

*Primary Examiner*—Alfred E. Smith

*Assistant Examiner*—Michael J. Tokar

*Attorney, Agent, or Firm*—David R. Fairbairn

[57] ABSTRACT

The signal-to-noise ratio in an optical memory is improved by using separate write and read beams. The read beam has a larger diameter than the write beam at the final focusing lens so that the read beam is focused to a read light spot at the memory medium which has a diameter less than the diameter of the write spot.

8 Claims, 2 Drawing Figures

OPTICAL MEMORY WITH IMPROVED SIGNAL-TO-NOISE RATIO

BACKGROUND OF THE INVENTION

The present invention is directed to optical storage techniques. In particular, the present invention relates to an improved readout technique for an optical memory which results in an improved readout signal-to-noise ratio.

In many optical memory systems, it is desirable to use an optical spot size changer to control the focused spot size of the light beam used for writing and reading. In particular, the readout signal in a thermomagnetic Curie point writing system can be enhanced by using a smaller spot for reading than for writing. This is due to the fact that the focused spot has a nonuniform intensity distribution such as a gaussian distribution. As a result, only the center portion of the focused light spot heats the memory medium above the writing temperature, and the written bit has a diameter which is smaller than the light spot diameter. During reading, it is desirable to have a read spot which is no larger than the written bit, since light which falls outside of the edge of the written bit results in a signal which subtracts from the readout signal.

To improve the signal-to-noise ratio, several devices and systems for optical spot size changing have been proposed. These systems change the size of the light beam so that the read light spot is smaller than the write light spot. U.S. Pat. Nos. 3,736,046 by J. D. Zook, 3,753,608 by E. Bernal G., and 3,705,758 by H. Haskal describe optical spot size changers which may be useful in optical memory systems.

The use of optical spot size changers in an optical memory, however present several difficulties. First, the proposed optical size changers are active devices which consume additional power. Second, they must be synchronized in their operation with the operation of the memory. Third, they present problems in alignment of optical elements.

SUMMARY OF THE INVENTION

The present invention achieves a readout spot of reduced diameter in an optical memory system without the use of an optical spot size changer. The present invention utilizes passive optical elements, does not require synchronization of operation, and does not require difficult alignment of optical elements.

The present invention achieves a smaller spot size for reading by using separate beams for reading and writing. The read and write beams are angularly separated in one direction, but share the final focusing lens. Thus the write beam is focused to a write spot while the read beam is focused to a read spot which is spatially separated in a first direction from the write spot. The read beam has a larger diameter than the write beam as it passes through the focusing lens. As a result, the read spot has a diameter which is less than the diameter of the write spot.

DESCRIPTION OF THE PREFERRED EMBODIMENTS

The present invention is an extremely simple, yet effective, technique for achieving read and write spots of different size in an optical memory. In the present invention separate read and write beams are used for reading and writing. These beams share a final focusing lens and are focused to a write spot S1 and a read spot S2. The improvement of the present invention is achieved by using a read beam which has a larger diameter than the write beam when the two beams pass through the final focusing lens. The minimum spot size d is given by the equation:

$$d = 1.22\ \lambda/D$$

where $\lambda$ = wavelength, and $D$ = beam diameter at the focusing lens.

Since the diameter $D$ of the read beam is larger, the minimum spot size of read spot S2 is smaller than the minimum spot size for write spot S1.

Figure 1:
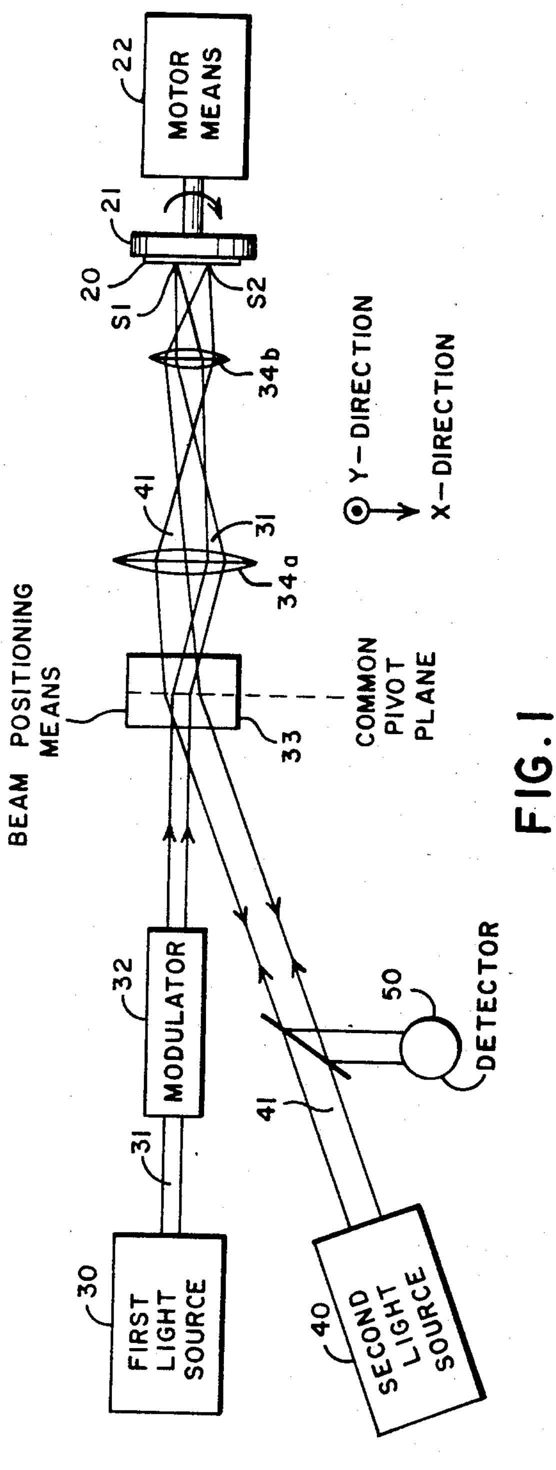
FIG. 1 diagramatically shows an optical memory utilizing the improved readout technique of the present invention.

FIG. 1 diagramatically shows an optical memory system implementing the improved readout technique of the present invention. For the purpose of discussion, this memory system may be assumed to be of the Curie point writing type. The present invention, however, is not limited to optical memories of this type, and may be utilized in other optical memories as well. In general, the system shown in FIG. 1 is similar to the memory system described in my earlier U.S. Pat. No. 3,715,740, which is assigned to the same assignee as the present application. The important difference, however, is that the read and write beams in the present application have different diameters at the final focusing lens.

The memory of FIG. 1 includes a memory medium 20, which preferably is a magnetic film such as manganese bismuth. Memory medium 20 is positioned on rotatable member 21, which is rotated by motor means 22. Rotatable member 21 may be, for example, a disk or a drum.

First light source 30 provides write beam 21 having an intensity sufficient to heat a region of memory medium 20 to a temperature above the Curie temperature. Modulator 32 is positioned in the path of write beam 31 between first light source 30 and memory medium 20. Beam positioning means 33 positions write beam 31 in a direction essentially orthogonal to the direction of motion of memory medium 20. For reference purposes, the direction of motion of memory medium 20 with respect to write beam 31 is hereafter referred to as the $x$ direction, and the direction in which write beam 31 is positioned by light positioning means 33 is referred to as the $y$ direction. Focusing means, which comprises first and second lenses 34*a* and 34*b*, focuses write beam 31 to a first focused light spot ("write spot S1") on memory medium 20.

Modulator 32 is designed to control the intensity of write beam 31. At a first extreme, modulator 32 allows the maximum intensity of write beam 31 to be transmitted to memory medium 20. The maximum beam intensity is sufficient to heat the region to a temperature above the Curie temperature. At a second extreme, modulator 32 attenuates write beam 31 to its minimum value, and the beam intensity reaching the region of memory medium 20 is not sufficient to raise its temperature to the Curie temperature.

Curie point writing is achieved when modulator 32 selectively allows write beam 31 to attain an intensity sufficient to heat a region or "bit" to a temperature above the Curie temperature. Modulator 32 then attenuates write beam 31, such that the region cools to a temperature below the Curie temperature. The magnetization direction of the region upon cooling is determined by the net magnetic field present at the location of the region. The net magnetic field may be due solely to the magnetic field of the magnetic material surrounding the region, or may be due to the magnetic field from the surrounding region plus an external magnetic field applied by a coil (not shown). When modulator 32 remains at the second extreme, it allows the magnetization direction of the region to remain unchanged.

In the system of FIG. 1, a second light source 40 produces a separate readout beam 41 which is used for magneto-optic readout. Read beam 41 and write beam 31 are angularly separated in the *x* direction. They have a common pivot plane which is located between first light source 30 and memory medium 20. Light beam positioning means 33 is located at the common pivot plane such that both beams are equally deflected in the *y* direction.

Read beam 41 also shares focusing lenses 34*a* and 34*b* with write beam 31. Read beam 41 is focused to a second focused light spot ("read spot S2") which is spatially separated from write spot S1 in the *x* direction. A region of memory medium 20 thus passes first through write spot S1 and then through read spot S2.

Detector 50 monitors the magneto-optic rotation caused by the region illuminated at read spot S2. In the system shown in FIG. 1, the Kerr magneto-optic effect is monitored by detector 50. It can be seen, however, that the Faraday magneto-optic effect, which utilizes light transmitted by memory medium 20 rather than light which has been reflected, may also be used.

In the present invention, read beam 41 has a larger diameter than write beam 31 when they pass through final focusing lens 34*b*. As a result, the diameter of the read spot S2 is smaller than the diameter of write spot S1. This results in an improvement in the readout signal-to-noise ratio.

Figure 2:
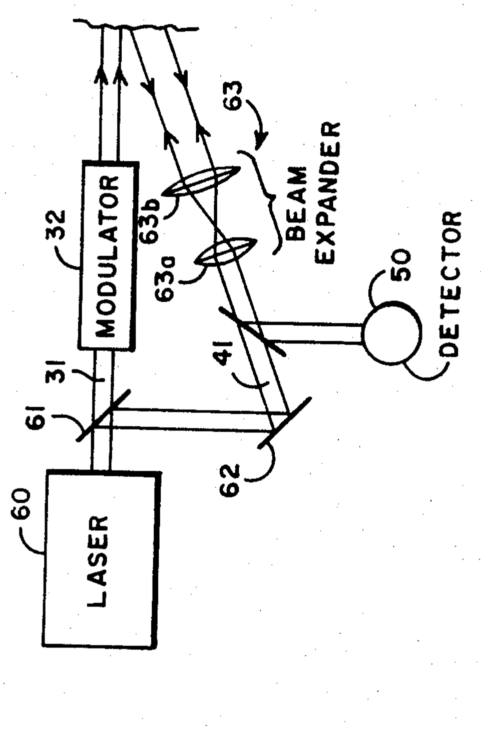
FIG. 2 diagramatically shows another embodiment of the present invention in which the read and write beams are generated by a single laser.

FIG. 2 shows another embodiment of the present invention which is similar to that shown in FIG. 1. Similar numerals are used to designate similar elements. First and second light source means 30 and 40 of FIG. 1 have been replaced by a single laser 60. Beam splitter 61 splits off a portion of write beam 31 to form read beam 41. Mirror 62 directs read beam 41 toward memory medium 20 such that write and read beams 31 and 41 have a common pivot plane similar to that shown in FIG. 1. The increased diameter of read beam 41 is achieved by beam expander 63. As shown in FIG. 2, beam expander 63 may comprise lenses 63*a* and 63*b* arranged in telescopic manner to increase the diameter of read beam 41.

In conclusion, the present invention achieves an improved readout signal-to-noise ratio in an optical memory in a simple and reliable manner. In addition, using a separate read and write beam allows a self checking of written bits within fractions of microseconds after storing. This advantage is described in U.S. Pat. No. 3,715,740. While this invention has been particularly shown and described with reference to preferred embodiments, it will be understood by those skilled in the art that changes in form and detail may be made without departing from the spirit and scope of the invention.

The embodiments of the invention in which an exclusive property or right is claimed are defined as follows:

1. An optical memory comprising:

a memory medium;

first light source means for producing a write beam;

second light source means for producing a read beam angularly separated from the write beam in a first direction;

focusing means for receiving the write beam and the read beam and for focusing the write and read beams to first and second focused light spots respectively at the memory medium, the first and second focused light spots spatially separated from one another in the first direction, the read beam having a larger beam diameter than the write beam at the focusing means whereby the second focused light spot has a diameter which is less than the diameter of the first focused light spot at the memory medium.

2. The optical memory of claim 1 and further comprising:

means for providing relative motion of the memory medium with respect to the write beam and the read beam in the first direction.

3. The optical memory of claim 2 wherein the read beam and the write beam have a common pivot plane.

4. The optical memory of claim 3 and further comprising:

positioning means positioned at the common pivot plane for positioning the read and write beams in a second direction essentially orthogonal to the first direction.

5. The optical memory of claim 1 wherein the second light source means comprises:

beam splitter means positioned in the path of the write beam to split off a portion of the write beam, thereby forming the read beam; and mirror means for directing the read beam toward the memory medium.

6. The optical memory of claim 5 and further comprising:

beam expander means positioned in the path of the read beam for increasing the diameter of the read beam.

7. A method of writing and reading information on a memory medium comprising:

directing a write beam through a focusing lens to a first focused light spot at the memory medium; and directing a read beam of larger diameter than the write beam through the focusing lens to a second focused light spot at the memory medium, the second focused light spot being spatially separated from the first focused light spot in a first direction and having a diameter which is less than the diameter of the first focused light spot.

8. The method of claim 7 and further comprising:

providing relative motion of the memory medium with respect to the write beam and the read beam in the first direction.

* * * * *